United States Patent
Ito et al.

(10) Patent No.: US 11,845,828 B2
(45) Date of Patent: Dec. 19, 2023

(54) POLYMERIZABLE COMPOSITION FOR OPTICAL MATERIAL, OPTICAL MATERIAL, AND PRODUCING METHOD THEREOF

(71) Applicant: Mitsui Chemicals, Inc., Tokyo (JP)

(72) Inventors: Shinsuke Ito, Omuta (JP); Masayuki Furuya, Arao (JP); Kouji Suesugi, Arao (JP); Takeshi Nishimura, Yanagawa (JP); Mamoru Tanaka, Fukuoka (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 16/345,421

(22) PCT Filed: Oct. 31, 2017

(86) PCT No.: PCT/JP2017/039318
§ 371 (c)(1),
(2) Date: Apr. 26, 2019

(87) PCT Pub. No.: WO2018/079829
PCT Pub. Date: May 3, 2018

(65) Prior Publication Data
US 2019/0248949 A1     Aug. 15, 2019

(30) Foreign Application Priority Data

Oct. 31, 2016 (JP) .................. 2016-212583

(51) Int. Cl.
| | | |
|---|---|---|
| *C08G 18/18* | (2006.01) | |
| *C08G 18/22* | (2006.01) | |
| *G02B 1/04* | (2006.01) | |
| *C08G 18/38* | (2006.01) | |
| *C08G 18/79* | (2006.01) | |
| *C08G 18/83* | (2006.01) | |
| *G02B 1/08* | (2006.01) | |
| *B29C 45/14* | (2006.01) | |
| *C08G 18/73* | (2006.01) | |
| *C08G 18/72* | (2006.01) | |
| *B29K 75/00* | (2006.01) | |

(52) U.S. Cl.
CPC .... *C08G 18/3844* (2013.01); *B29C 45/14008* (2013.01); *C08G 18/18* (2013.01); *C08G 18/38* (2013.01); *C08G 18/722* (2013.01); *C08G 18/73* (2013.01); *C08G 18/79* (2013.01); *C08G 18/792* (2013.01); *C08G 18/834* (2013.01); *G02B 1/04* (2013.01); *G02B 1/041* (2013.01); *G02B 1/08* (2013.01); *B29K 2075/00* (2013.01); *C08G 18/791* (2013.01)

(58) Field of Classification Search
CPC .... C08G 18/38; C08G 18/18; C08G 18/2027; C08G 18/3865; C08G 18/79; C08G 18/73; C08G 18/791; C08G 18/792; C08G 18/722; G02B 1/04
See application file for complete search history.

(56) References Cited

U.S. PATENT DOCUMENTS

| | | | | |
|---|---|---|---|---|
| 3,718,611 A | * | 2/1973 | Maxey et al. ......... | C08G 18/18 521/88 |
| 3,725,353 A | * | 4/1973 | Fujimoto ........... | C08G 18/3821 528/49 |
| 4,156,768 A | * | 5/1979 | Cook .................. | C08G 18/833 525/440.06 |
| 4,689,387 A | | 8/1987 | Kajimoto et al. | |
| 5,693,738 A | | 12/1997 | Okazaki et al. | |
| 5,698,613 A | * | 12/1997 | Jhaveri .............. | B22C 1/2273 523/148 |
| 5,981,622 A | * | 11/1999 | Geoffrey ............ | B22C 1/226 523/463 |
| 8,586,695 B2 | | 11/2013 | Kawato et al. | |
| 9,464,155 B2 | | 10/2016 | Kanagawa et al. | |
| 9,568,644 B2 | | 2/2017 | Renzi et al. | |
| 9,777,199 B2 | | 10/2017 | Miyagawa et al. | |
| 9,778,397 B2 | | 10/2017 | Ryu et al. | |
| 9,944,029 B2 | | 4/2018 | Kakinuma | |
| 10,081,703 B2 | | 9/2018 | Tsukada et al. | |
| 10,266,636 B2 | | 4/2019 | Tsukada et al. | |
| 2005/0261421 A1 | | 11/2005 | Schmitt et al. | |
| 2008/0097045 A1 | * | 4/2008 | Isahaya ............... | C08G 18/12 525/457 |
| 2010/0029890 A1 | | 2/2010 | Kawato et al. | |
| 2011/0065884 A1 | | 3/2011 | Kawato et al. | |
| 2013/0066034 A1 | | 3/2013 | Renzi et al. | |

(Continued)

FOREIGN PATENT DOCUMENTS

| | | |
|---|---|---|
| DE | 40 17 941 A1 | 12/1991 |
| EP | 1111442 A1 * 6/2001 | ............. C08G 69/32 |

(Continued)

OTHER PUBLICATIONS

JP-2008074958_Apr. 2008_English Translation.*
JP-07165873_Jun. 1995_English Translation.*
Notice of Reasons for Refusal issued by the Japanese Patent Office in corresponding Japanese Patent Application No. 2018-547854 dated Sep. 3, 2019 (5 pages including partial English translation).
International Search Report (with English translation) and Written Opinion issued in corresponding International Patent Application No. PCT/ PCT/JP2017/039318, 10 pages (dated Jan. 29, 2018).
"Latest Polyurethane Application Technology" CMC, issue, p. 27-31, 1983.

(Continued)

*Primary Examiner* — Michael L Leonard
(74) *Attorney, Agent, or Firm* — BUCHANAN INGERSOLL & ROONEY PC

(57) ABSTRACT

A polymerizable composition for an optical material of the present invention includes (A) a compound of which pKa value is 1 to 9, (B) a di- or higher functional iso(thio)cyanate compound, and (C) a di- or higher functional active hydrogen compound.

10 Claims, No Drawings

(56) References Cited

U.S. PATENT DOCUMENTS

| | | | |
|---|---|---|---|
| 2014/0178819 A1* | 6/2014 | Wu | G03F 7/027 430/285.1 |
| 2014/0323678 A1 | 10/2014 | Renzi et al. | |
| 2015/0087774 A1* | 3/2015 | Greszta-Franz | C08G 18/755 524/590 |
| 2015/0099125 A1 | 4/2015 | Kanagawa et al. | |
| 2015/0203727 A1 | 7/2015 | Miyagawa et al. | |
| 2015/0331147 A1 | 11/2015 | Ryu et al. | |
| 2016/0237198 A1 | 8/2016 | Tsukada et al. | |
| 2016/0282515 A1 | 9/2016 | Tsukada et al. | |
| 2017/0057184 A1 | 3/2017 | Kakinuma | |
| 2017/0320996 A1* | 11/2017 | Matsuki | C08G 18/809 |

FOREIGN PATENT DOCUMENTS

| | | | | |
|---|---|---|---|---|
| JP | S60199016 A | | 10/1985 | |
| JP | 07165873 A | * | 6/1995 | |
| JP | H08208792 A | | 8/1996 | |
| JP | 2002-528613 A | | 9/2002 | |
| JP | 2004277621 A | | 10/2004 | |
| JP | 2005105084 A | | 4/2005 | |
| JP | 2005105085 A | | 4/2005 | |
| JP | 2008074957 A | | 4/2008 | |
| JP | 2008074958 A | * | 4/2008 | C08G 18/16 |
| JP | 2008074958 A | | 4/2008 | |
| JP | 2011246569 A | | 12/2011 | |
| JP | 2011252176 A | | 12/2011 | |
| JP | 2013528681 A | | 7/2013 | |
| JP | 2014040587 A | | 3/2014 | |
| WO | 00/26272 A1 | | 5/2000 | |
| WO | 2008035457 A1 | | 3/2008 | |
| WO | 2013153907 A1 | | 10/2013 | |
| WO | 2014077369 A1 | | 5/2014 | |
| WO | 2015060259 A1 | | 4/2015 | |
| WO | 2015060260 A1 | | 4/2015 | |
| WO | 2015/119220 A1 | | 8/2015 | |
| WO | 2015125817 A1 | | 8/2015 | |
| WO | 2015/137401 A1 | | 9/2015 | |
| WO | 2016076193 A1 | | 5/2016 | |

OTHER PUBLICATIONS

Office Action dated Nov. 26, 2019, by the Japanese Patent Office in corresponding Japanese Patent Application No. 2018-547854. (2 pages).

The extended European Search Report dated Jun. 3, 2020, by the European Patent Office in corresponding European Patent Application No. 17864887.1-1102 (11 pages).

Office Action dated Jan. 28, 2020, by the Japanese Patent Office in corresponding Japanese Patent Application No. 2018-547854. (2 pages).

* cited by examiner

POLYMERIZABLE COMPOSITION FOR OPTICAL MATERIAL, OPTICAL MATERIAL, AND PRODUCING METHOD THEREOF

TECHNICAL FIELD

The present invention relates to a polymerizable composition for an optical material, an optical material, and a producing method thereof. More specifically, the present invention relates to a polymerizable composition for a poly(thio)urethane-based optical material containing a catalyst for poly(thio) urethanization reaction, an optical material, and a producing method thereof.

BACKGROUND ART

A plastic lens is lighter and less likely to crack compared to an inorganic lens. Thus, in recent years, the plastic lens has been rapidly used as an optical material such as a spectacle lens and a camera lens.

Glass has been a main material used as an optical material from long ago, but in recent years, various plastics for an optical material have been developed and widely used as a substitute for glass. Since plastic materials have excellent optical properties also as a material for a spectacle lens, are light, hardly crack, and also have excellent moldability, plastic materials such as acrylic resin, aliphatic carbonate resin, polycarbonate, and polythiourethane are mainly used. Among these, a representative example of a plastic material having a high refractive index includes a polythiourethane resin obtained from a polymerizable composition containing an isocyanate compound and a thiol compound (Patent Document 1).

While plastic materials are used for the purpose of improving performance of inorganic lens materials, plastic materials using fossil resources have become a concern for the global environment, such as resource depletion and carbon dioxide emissions. For this reason, in recent years, harmony with the global environment and reduction of the environmental load have been tasks in the manufacturing industries, and development of products or technologies considering the environment has been accelerated.

In the wake of such circumstantial changes, in the development of lens materials as well, utilization of biomass resources such as plant-derived raw materials is considered, for example (Patent Documents 2 and 3). In addition, this move is also seen in the polyurethane industries. In particular, regulation of the use of organotin catalyst which is versatilely used as a catalyst for producing polyurethane is being enforced mainly in developed countries. For this reason, development of substitutive catalysts has also been actively proceeded.

In a case where polyurethane or polythiourethane is manufactured by reaction with an active hydrogen compound containing an isocyanate compound or a hydroxyl group or mercapto group, an organometallic catalyst or tertiary amine catalyst is mainly used as the reaction catalyst.

As the organometallic catalyst, organotin catalyst such as dibutyltin dichloride (DBC), dibutyltin dilaurate (DBTDL), and dibutyltin diacetate, organic acid salts such as iron salt, nickel salt and zinc salt, and a compound such as acetylacetonate complex are used, and as the tertiary amine catalyst, compounds such as triethylene diamine, N,N-dimethylethanolamine, triethylamine, and N-ethylmorpholine are used.

In a case of comparing the both catalysts, from a viewpoint of reactivity, the organometallic catalyst generally has higher activity, and is more frequently used (Non-Patent Document 1).

As the catalyst used at the time of producing reaction of polythiourethane resin forming the useful optical material, an organotin catalyst represented by DBC or DBTDL in the related art is versatilely used since the organotin catalyst has high catalyst activity. However, as previously described, in recent years, a problem of toxicity of the organotin catalyst has been pointed out.

For example, tributyltin contained in DBTDL as impurities or tributyltin chloride contained in DBC as impurities becomes a problem of harmfulness to a human body as an endocrine-disrupting chemical substance. In addition, this move has already been made to regulate the use of an organotin compound, mainly in Europe. Therefore, the spectacle lens manufacturing industries using polythiourethane resins are currently in a situation where urgent development of the alternative to the tin catalyst is required. In the future, there is a high possibility that regulation of the use of organotin catalysts would be further enforced not only in Europe but also across the world, and it would become essential to develop catalysts with high safety and high activity, which can be substituted for the organotin catalyst.

For example, as the alternative to the tin catalyst in the polyurethane field, a catalyst composition containing carboxylic acid metal compound and quaternary ammonium salt compound (Patent Document 4), a catalyst composition formed of two cyclic tertiary amine compound and quaternary ammonium salt compound (Patent Document 5), a metal catalyst having coordination of alkoxy group or carboxy group with titan or aluminum (Patent Document 6), and the like are known. These catalysts are used as catalysts for producing polyurethane resin which is produced by mainly using polyisocyanates and polyols, and the patent documents do not disclose use examples as a catalyst in the polythiourethane-based optical material manufactured by using polyisocyanates and polythiols.

In the field of the polythiourethane-based optical material, as an example of reporting non-tin catalyst, an example of using Lewis acid in combination with tertiary amino having strong activity (Patent Document 7), amine hydrochloride (Patent Document 8), imidazole catalyst (Patent Documents 9 and 10), an example of using amine compound and phosphate in combination (Patent Document 11), an example of using aliphatic tertiary amine and disubstituted phosphoric acid in combination (Patent Document 12), and the like are known.

RELATED DOCUMENT

Patent Document

[Patent Document 1] JPS60-199016
[Patent Document 2] WO2015/060260
[Patent Document 3] WO2015/060259
[Patent Document 4] JP2005-105084
[Patent Document 5] JP2005-105085
[Patent Document 6] JP2004-277621
[Patent Document 7] JPH08-208792
[Patent Document 8] WO2008/035457
[Patent Document 9] WO2014/077369
[Patent Document 10] WO2015/125817
[Patent Document 11] JP2008-074958
[Patent Document 12] JP2013-528681

Non-Patent Document

[Non-Patent Document 1] "Latest Polyurethane Application Technology" CMC, 1983 issue, p. 27-31

SUMMARY OF THE INVENTION

Technical Problem

However, there was room for improvement for the above-described non-tin catalyst developed as the alternative to the organotin catalyst in the following point.

Examples of a process for producing a polythiourethane resin as a material for plastic lens include a cast polymerization method of injecting a polymerizable composition into a mold and heating and curing thereof, in general. In the method, polymerization reaction is performed for several hours to several tens of hours while gradually raising the temperature from a low temperature to a high temperature. In a case of using the previously described non-tine-based catalyst, polymerization reaction was proceeded during a time when the mixed polymerizable composition was being injected into a mold, and sufficient pot life could not be ensured in some cases. On the other hand, heat resistance was insufficient due to the slow progress of polymerization during heat polymerization and insufficient polymerization degree of a resin, convection was caused by heat generation during polymerization, as the result, optical nonuniformity such as striae was caused in a lens, and cloudiness was further caused. In addition, during polymerization, it became difficult to control the polymerization, such as releasing a molded product from the mold during the polymerization step. As described herein, there remained room for improvement for the non-tin catalyst in the related art.

Solution to Problem

As a result of intensive examination to achieve the above object, the present inventors found out that, by using a specific non-tin catalyst, it is possible to sufficiently ensure pot life of a polymerizable composition for an optical material, it becomes easy to control polymerization, and it is possible to control cloudiness or striae of a resin molded product obtained by curing the polymerizable composition.

That is, the present invention can be shown as below.

[1] A polymerizable composition for an optical material including:

(A) a compound of which pKa value is 1 to 9;

(B) a di- or higher functional iso(thio)cyanate compound; and (C) a di- or higher functional active hydrogen compound.

[2] The polymerizable composition for an optical material according to [1], in which the compound (A) is at least one selected from a compound represented by the following general formula (1) and a compound represented by the following general formula (2);

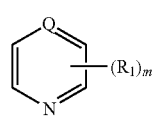

(1)

in general formula (1), $R_1$ represents a straight chain alkyl group having 1 to 20 carbon atoms, a branched alkyl group having 3 to 20 carbon atoms, a cycloalkyl group having 3 to 20 carbon atoms, or a halogen atom, and $R_1$ which exists in plural numbers may be the same or different. Q represents a carbon atom or a nitrogen atom. m represents an integer of 0 to 5.

(2)

in general formula (2), $R_2$, $R_3$, and $R_4$ may be the same or different, and represent a straight chain alkyl group having 3 to 20 carbon atoms, a branched alkyl group having 3 to 20 carbon atoms, a cycloalkyl group having 3 to 20 carbon atoms, and an allyl group.

[3] The polymerizable composition for an optical material according to [1] or [2], in which the compound (A) is at least one selected from 2-methylpyrazine, pyridine, α-picoline, β-picoline, γ-picoline, 2,6-lutidine, 3,5-lutidine, 2,4,6-trimethylpyridine, 3-chlorpyridine, triallylamine, and trioctylamine.

[4] The polymerizable composition for an optical material according to any one of [1] to [3], further comprising a polyisocyanate-modified product (D).

[5] The polymerizable composition for an optical material according to [4], in which the polyisocyanate-modified product (D) is an isocyanurate product of aliphatic polyisocyanate.

[6] The polymerizable composition for an optical material according to any one of [1] to [5], in which the iso(thio)cyanate compound (B) is at least one selected from a group consisting of hexamethylene diisocyanate, pentamethylene diisocyanate, xylylene diisocyanate, isophorone diisocyanate, bis(isocyanatomethyl) cyclohexane, bis(isocyanatocyclohexyl) methane, 2,5-bis(isocyanatomethyl)bicyclo-[2.2.1]-heptane, 2,6-bis(isocyanatomethyl)bicyclo-[2.2.1]-heptane, trilene diisocyanate, phenylene diisocyanate, and 4,4'-diphenylmethane diisocyanate.

[7] The polymerizable composition for an optical material according to any one of [1] to [6], in which the active hydrogen compound (C) is a di- or higher functional polythiol compound and/or di- or higher functional polyol compound.

[8] The polymerizable composition for an optical material according to [7], in which the active hydrogen compound (C) is a di- or higher functional polythiol compound.

[9] The polymerizable composition for an optical material according to [7] or [8], in which the polythiol compound is at least one selected from a group consisting of pentaerythritol tetrakis(2-mercaptoacetate), pentaerythritol tetrakis(3-mercaptopropionate), bis(2-mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis (mercaptomethylthio)ethyl)-1,3-dithiethane, and ethylene glycol bis(3-mercaptopropionate).

[10] A molded product obtained by curing the polymerizable composition for an optical material according to any one of [1] to [9].

[11] An optical material comprised of the molded product according to [10].

[12] A plastic lens comprised of the molded product according to [10].

[13] A plastic polarizing lens including:
a polarizing film; and
a base layer, which is comprised of the molded product according to [10], which is formed over at least one surface of the polarizing film.

[14] A process for producing a plastic lens including:
a step of molding the polymerizable composition for an optical material according to any one of [1] to [9] into a mold; and
a step of heating the polymerizable composition for an optical material to polymerize the composition.

[15] A process for producing a plastic polarizing lens including:
a step of fixing a polarizing film in a mold for a lens cast, in a state in which at least one surface of the polarizing film is separated from the mold;
a step of injecting the polymerizable composition for an optical material according to any one of [1] to [9] into a cavity between the polarizing film and the mold; and
a step of polymerizing and curing the polymerizable composition for an optical material to stack a base layer over at least one surface of the polarizing film.

Advantageous Effects of Invention

According to a polymerizable composition for an optical material of the present invention, it is possible to sufficiently ensure pot life of a polymerizable composition at the time of producing a lens, and the producing stability is excellent since polymerization control is easy. In addition, according to the polymerizable composition for an optical material of the present invention, it is possible to provide a plastic lens excellent in optical properties such as a refractive index, heat resistance, and releasability and of which cloudiness and striae are suppressed.

DESCRIPTION OF EMBODIMENTS

A polymerizable composition for an optical material of the present invention is described based on the following embodiment.

The polymerizable composition for an optical material of the present embodiment includes:
(A) a compound of which pKa value is 1 to 9;
(B) a di- or higher functional iso(thio)cyanate compound; and
(C) a di- or higher functional active hydrogen compound.

Hereinafter, each component used in the present embodiment is described in detail.

[Compound (A)]

It is possible to use a compound of which pKa value is 1 to 9 as the compound (A).

The pKa value of the compound (A) can be preferably from 3 to 8, and more preferably 4 to 8, from a viewpoint of the effect of the present invention.

By using the compound as the compound (A), it is possible to sufficiently ensure pot life of a polymerizable composition at the time of producing a lens, and polymerization control is easy. Therefore, the composition is excellent in producing stability. In addition, it is possible to provide a plastic lens excellent in optical properties such as a refractive index, heat resistance, and releasability and of which cloudiness and striae are suppressed.

On the other hand, in a case of using a compound of which pKa value is out of a range of 1 to 9 as the compound (A), it is not possible to prepare a plastic lens, and even in a case where the lens can be prepared, it is not possible to sufficiently ensure pot life of the polymerizable composition at the time of producing a lens, and heat resistance or releasability is low, and cloudiness or striae is caused in some cases.

As the compound (A), it is possible to use at least one selected from 2-methylpyrazine, pyridine, α-picoline, β-picoline, γ-picoline, 2,6-lutidine, 3,5-lutidine, 2,4,6-trimethylpyridine, 3-chlorpyridine, N,N-diethylaniline, N,N-dimethylaniline, hexamethylenetetramine, quinoline, isoquinoline, N,N-dimethyl-p-toluidine, N,N-dimethylpiperazine, quinaldine, 4-methylmorpholine, triallylamine, and trioctylamine.

The pKa value (acid dissociation index) can be measured by a method disclosed in (a) The Journal of Physical Chemistry vol. 68, number 6, page 1560 (1964), (b) a method using an automatic potentiometric titrator (AT-610 (trademark) and the like) manufactured by Kyoto Electronics Co., Ltd., and the like, and (c) an acid dissociation index disclosed in Handbook of Chemistry from Chemical Society of Japan (Third edition, Jun. 25, 1984, published by Maruzen Co., Ltd.) and the like can be used.

In the present embodiment, the compound (A) is preferably at least one selected from a compound represented by the following general formula (1) and a compound represented by the following general formula (2).

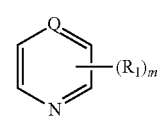

(1)

In general formula (1), $R_1$ represents a straight chain alkyl group having 1 to 20 carbon atoms, a branched alkyl group having 3 to 20 carbon atoms, a cycloalkyl group having 3 to 20 carbon atoms, or a halogen atom, preferably represents a straight chain alkyl group having 1 to 20 carbon atoms or an halogen atom, and more preferably represents a straight chain alkyl group having 1 to 3 carbon atoms or a chlorine atom. $R_1$ which exists in plural numbers may be the same or different. Q represents a carbon atom or a nitrogen atom.

m represents an integer of 0 to 5, preferably represents an integer of 0 to 3, and more preferably represents an integer of 1 to 3.

Examples of the straight chain alkyl group having 1 to 20 carbon atoms represented by $R_1$ include a methyl group, an ethyl group, an n-propyl group, an n-butyl group, a pentyl group, a hexyl group, a heptyl group, an n-octyl group, a nonyl group, a decyl group, a dodecyl group, and the like, examples of the branched alkyl group having 3 to 20 carbon atoms include an isopropyl group, an isobutyl group, a t-butyl group, an isopentyl group, an isooctyl group, a 2-ethylhexyl group, a 2-propylpentyl group, an isodecyl group, and the like, and examples of the cycloalkyl group having 3 to 20 carbon atoms include a cyclopropyl group, a cyclobutyl group, a cyclopentyl group, a cyclohexyl group, a cycloheptyl group, a cyclooctyl group, and the like.

Examples of the compound represented by general formula (1) include 2-methylpyrazine, pyridine, α-picoline, β-picoline, γ-picoline, 2,6-lutidine, 3,5-lutidine, 2,4,6-trimethylpyridine, 3-chlorpyridine, or the like, and at least one selected therefrom can be used.

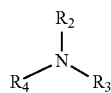

(2)

In general formula (2), $R_2$, $R_3$, and $R_4$ may be the same or different, represent a straight chain alkyl group having 3 to 20 carbon atoms, a branched alkyl group having 3 to 20 carbon atoms, a cycloalkyl group having 3 to 20 carbon atoms, and an allyl group, preferably represents a straight chain alkyl group having 3 to 20 carbon atoms, more preferably represents a straight chain alkyl group having 3 to 10 carbon atoms, and particularly preferably represents a straight chain alkyl group having 5 to 10 carbon atoms.

Examples of the straight chain alkyl group having 3 to 20 carbon atoms represented by $R_2$, $R_3$, and $R_4$ include an n-propyl group, an n-butyl group, a pentyl group, a hexyl group, a heptyl group, an n-octyl group, a nonyl group, a decyl group, a dodecyl group, and the like.

As the compound represented by general formula (2), trioctyl amine, triallylamine, and the like, and at least one selected therefrom can be used.

As the compound (A), one or two or more of the compounds of general formula (1) and the compound of general formula (2) can be combined and used.

[Di- or Higher Functional Iso(Thio)Cyanate Compound (B)]

A di- or higher functional iso(thio)cyanate compound (B) is a compound containing two or more iso (thio) cyanate groups, and contains an isocyanate compound and an isothiocyanate compound.

Examples of the iso (thio) cyanate compound (B) include a compound selected from the group consisting of an aliphatic polyisocyanate compound, an alicyclic polyisocyanate compound, an aromatic polyisocyanate compound, a heterocyclic polyisocyanate compound, a sulfur-containing heterocyclic polyisocyanate compound, an aliphatic polyisocyanate compound, an alicyclic polyisothiocyanate compound, an aromatic polyisothiocyanate compound, and a sulfur-containing heterocyclic polyisothiocyanate compound.

Examples of the isocyanate compound include aliphatic polyisocyanate compounds such as pentamethylene diisocyanate, hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, p-xylene diisocyanate, α,α,α',α'-tetramethylxylylene diisocyanate, bis(isocyanatomethyl)naphthalene, mesithylene triisocyanate, bis(isocyanatomethyl)sulfide, bis(isocyanatomethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane, and the like; alicyclic polyisocyanate compounds such as isophorone diisocyanate, bis(isocyanatomethyl)cyclohexane, dicyclohexylmethane-4,4'-diisocyanate, cyclohexane diisocyanate, methylcyclohexane diisocyanate, dicylohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane, and the like; and aromatic polyisocyanate compounds such as 1,3-phenylene diisocyanate, 1,4-phenylene diisocyanate, 2,4-tolylene diisocyanate, 2,6-tolylene diisocyanate, 4,4'-diphenylmethane diisocyanate, diphenyl sulfide-4,4-diisocyanate, and the like; heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl) tetrahyrothiophene, 2,5-diisocyanato-1,4-dithiane, 2,5-bis(isocyanatomethyl)-1,4-dithiane, 4,5-diisocyanate-1,3-didithiolane, 4,5-bis(isocyanatomethyl)-1,3-dithiolane, and the like. As the iso(thio)cyanate compound (B), one or two or more selected therefrom can be combined and used.

In addition, a halogen-substituted product such as a chlorine-substituted product thereof and a bromine-substituted product thereof, an alkyl-substituted product thereof, an alkoxy-substituted product thereof, a nitro-substituted product thereof, and the like can be also used.

Examples of the isothiocyanate compound include aliphatic polyisocyanate compounds such as hexamethylene diisothiocyanate, lysine diisothiocyanatemethyl ester, lysine triisothiocyanate, m-xylene diisothiocyanate, bis(isothiocyanatomethyl)sulfide, bis(isothiocyanatoetyl)sulfide, bis(isothiocyanatoethyl)disulfide, and the like; alicyclic polyisothiocyanate compounds such as isophorone diisothiocyanate, bis(isothiocyanatomethyl)cyclohexane, dicyclohexylmethane diisothiocyanate, cyclohexane diisothiocyanate, methylcyclohexane diisothiocyanate, 2,5-bis(isothiocyanatomethyl)bicylo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis(isothiocyanatomethyl)tricyclodecane, 4,9-bis(isothiocyanatomethyl)tricyclodecane, and the like; aromatic polyisothiocyanate compounds such as tolylene diisocyanate, 4,4-diphenylmethane diisothiocyanate, diphenyl disulfide-4,4-diisothiocyanate, and the like; and sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl)tetrahydrothiophene, 3,4-bis(isothiocyanatomethyl)tetrahydrothiophene, 2,5-diisothiocyanate-1,4-dithiane, 2,5-bis(isothiocyanatomethyl)-1,4-dithiane, 4,5-diisothiocyanate-1,3-dithiolane, 4,5-bis(isothiocyanatomethyl)-1,3-dithiolane, and the like. As the iso(thio)cyanate compound (B), one or two or more selected therefrom can be combined and used.

In addition, a halogen-substituted product such as a chlorine-substituted product thereof, a bromine-substituted product thereof, an alkyl-substituted product thereof, an alkoxy-substituted product thereof, a nitro-substituted product thereof, and the like can be also used.

In the present embodiment, as the iso(thio)cyanate compound (B), preferably, at least one selected from the group consisting of hexamethylene diisocyanate, pentamethylene diisocyanate, xylylene diisocyanate, isophorone diisocyanate, bis(isocyanatomethyl)cyclohexane, dicyclohexylmethane-4,4'-diisocyanate, 2,5-bis(isocyanatomethyl)bicyclo-[2.2.1]-heptane, 2,6-bis(isocyanatomethyl)bicyclo-[2.2.1]- heptane, tolylene diisocyanate, phenylene diisocyanate, and 4,4'-diphenylmethane diisocyanate can be used.

[Di- or Higher Functional Active Hydrogen Compound (C)]

Examples of a di- or higher functional active hydrogen compound (C) include a polyol compound containing two or more hydroxyl groups, a polythiol compound containing two or more mercapto groups, and the like, and one or two or more can be combined and used. The polyol compound is one or more aliphatic or alicyclic polyols, and specific examples thereof include straight chain or branched chain aliphatic polyol, alicyclic polyol, and alcohol of the addition of ethylene oxide, propylene oxide, and ε-caprolactone to these polyols, and the like.

Examples of the straight chain or branched chain aliphatic polyol include ethylene glycol, diethylene glycol, triethylene glycol, propylene glycol, dipropylene glycol, tripropylene glycol, 1,3-propandiol, 2,2-dimethyl-1,3-propanediol, 2,2-diethyl-1,3-propanediol, 1,2-butanediol, 1,3-butanediol, 1,4-butanediol, 3-methyl-1,3-butanediol, 1,2-pentanediol, 1,3-pentanediol, 1,5-pentanediol, 2,4-pentanediol, 2-methyl-2,4-pentandiol, 3-methyl-1,5-pentanediol, 1,6-hexanediol, 2,5-hexanediol, glycerol, diglycerol, polyglycerol, trimethylolpropane, pentaerythritol, di(trimethylolpropane), and the like.

Examples of the alicyclic polyol include 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 4,4'-bicyclohexanol, 1,4-cyclohexanedimethanol, and the like.

A compound of the addition of ethylene oxide, propylene oxide, and ε-caprolactone to these polyols is also used. Examples thereof include ethylene oxide adduct of glycerol, ethylene oxide adduct of trimethylol propane, ethylene oxide adduct of pentaerythritol, propylene oxide adduct of glycerol, propylene oxide adduct of trimethylol propane, propylene oxide adduct of pentaerythritol, caprolactone-modified glycerol, caprolactone-modified trimethylol propane, caprolactone-modified pentaerythritol, and the like.

In addition, in the present embodiment, as the active hydrogen compound (C), a polythiol compound containing two or more hydroxyl groups can be preferably used.

Examples of the polythiol compound include aliphatic polythiol compounds such as methanediol, 1,2-ethanediol, 1,2,3-propanetrithiol, 1,2-cyclohexanediol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylol propane tris(2-mercaptoacetate), trimethylol propane tris(3-mercaptopropionate), trimethylol ethane tris(2-mercaptoacetate), trimethylol ethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, ester of these thioglycol acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolate bis(2-mercaptoethyl ester), thiodipropionic acid bis(2-mercaptoethyl ester), dithiodiglycolate bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, tris(mercaptoethylthio)methane, and the like; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethylneoxy)benzene, 1,3,5-tris(mercaptoethyleneoxy)benzene, 2,5-toluenedithiol, 3,4-toluenedithiol, 1,5-naphthalenedithiol, 2,6-naphthalenedithiol, and the like; heterocyclic polythiol compounds such as 2-methylamino-4,6-dithiol-sym-triazine, 3,4-thiophendithiol, bismuthiol, 4,6-bis(mercaptomethylthio)-1,3-dithiane, 2-(2,2-bis(mercaptomethylthio)ethyl)-1,3-dithethane, and the like.

As the polythiol compound that can be used in the present embodiment, from a viewpoint of the effect of the present invention, more preferably, at least one compound selected from the group consisting of pentaerythritol tetrakis(2-mercaptoacetate), pentaerythritol tetrakis(3-mercaptopropionate), bis(2-mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, 2-(2,2,-bis(mercaptomethylthio)ethyl)-1,3-dithietane, and ethylene glycol bis(3-mercaptopropionate) is used, and particularly preferably, at least one compound selected from the group consisting of pentaerythritol tetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane is used.

[Polyisocyanate-Modified Product (D)]

The polymerizable composition for an optical material of the present embodiment can further include a polyisocyanate-modified product (D). As the polyisocyanate, a compound exemplified in the iso(thio)cyanate compound (B) can be used.

Examples of the polyisocyanate-modified product (D) include a multimer, a biuret-modified product, an allophanate-modified product, an oxadiazine trione-modified product, a polyol-modified product, and the like of polymers of aliphatic polyisocyanate such as pentamethylene diisocyanate, hexamethylene diisocyanate, heptamethylene diisocyanate, lysine diisocyanate, lysine triisocyanate, m-xylylene diisocyanate, dimer acid diisocyanate, octamethylene diisocyanate, decamethylene diisocyanate, alicyclic polyisocyanate such as isophorone diisocyanate, bis(isocyanatomethyl)cyclohexane, bis(isocyanatocyclohexyl)methane, 2,5-bis(isocyanatomethyl)bicyclo-[2.2.1]-heptane, and 2,6-bis(isocyanatomethyl)bicyclo-[2.2.1]-heptane, a multimer of aromatic polyisocyanate such as tolylene diisocyanate, phenylene diisocyanate, and 4,4'-diphenylmethane diisocyanate. The polyisocyanate-modified product (D) is preferably an aliphatic polyisocyanate-modified product, more preferably a nurate product of aliphatic polyisocyanate, and particularly preferably a nurate product of pentamethylene diisocyanate, hexamethylene diisocyanate, or m-xylylene diisocyanate. These nurates may include a nurate catalyst, a terminator thereof, or the like.

In the present embodiment, as the compound (B) and the compound (C), and the compound (D) used depending on the necessity, a compound obtained from a plant-derived raw material can be used. Since the compound (A) is a non-metallic catalyst, by using the compound obtained from the plant-derived raw material, it is possible to contribute to preservation of the global environment, and to provide various optical materials such as plastic lenses which are in harmony with the global environment.

[Other Components]

The polymerizable composition of the present embodiment may further include additives such as an internal mold release agent, a resin modifier, a photostabilizer, a bluing agent, an ultraviolet absorber, an anti-oxidant, a coloring inhibitor, and a pigment.

That is, in the polymerizable composition of the present embodiment, a modifier can be added within a range not impairing the effect of the present invention, for the purpose of controlling all properties of the obtained molded product such as optical properties, shock resistance, and specific gravity, and adjusting handling properties of each component of the polymerizable composition.

(Internal Mold Release Agent)

The polymerizable composition of the present invention can include an internal mold release agent for the purpose of improving realeasability from a mold after molding.

As the internal mold release agent, acidic phosphate ester can be used. Examples of the acidic phosphate ester include phosphate monoester and phosphate diether, and can be used alone or two or more can be mixed and used.

For example, ZelecUN manufactured by STEPAN Corporation, an internal mold release agent for MR manufactured by Mitsui Chemicals Co., Ltd., JP Series manufactured by Johoku Chemical Co., Ltd., Phosphanol Series manufactured by Toho Chemical Industry, Co., Ltd., AP manufactured by Dihachi Chemical Industry Co., Ltd., DP Series, and the like can be used.

(Resin Modifier)

In addition, in the polymerizable composition for an optical material of the present invention, a resin modifier can be added within a range not impairing the effect of the present invention, for the purpose of controlling all properties of the obtained resin such as optical properties, shock resistance, and specific gravity, and adjusting viscosity or pot life of the composition.

Examples of the resin modifier include an episulfide compound, an alcohol compound, an amine compound, an epoxy compound, organic acid and anhydride thereof, an olefin compound including (meth)acrylate compound, and the like.

(Photostabilizer)

As the photostabilizer, a hindered amine compound can be used. Examples of the photostabilizer can include Lowilite76 and Lowilite92 manufactured by Chemtura Corporation, Tinuvin144, Tinuvin292, and Tinuvin765 manufactured by BASF Corporation, Adeka Stab LA-52 and LA-72 manufactured by ADEKA Corporation, JF-95 manufactured by Johoku Chemical Co., Ltd., and the like as commercially available products.

(Bluing Agent)

Examples of the bluing agent include those having an absorbent band in a wavelength range of from orange to yellow of a visible light region and a function of adjusting hues of an optical material comprised of a resin. The bluing agent further specifically includes a substance showing color from blue to violet.

(Ultraviolet Absorber)

Examples of the ultraviolet absorber can include a benzophenone-based compound, a triazine-based compound, a benzotriazole-based compound, and the like.

Examples of the ultraviolet absorber include benzophenone-based ultraviolet absorbers such as 2,2'-dihydroxy-4-methoxybenzophenone, 2-hydroxy-4-acryloyloxybenzophenone, 2-hydroxy-4-acryloyloxy-5-tert-butylbenzophenone, and 2-hydroxy-4-acryloyloxy-2',4'-dichlorobenzophenone; triazine-based ultraviolet absorbers such as 2-[4-[(2-hydroxy-3-dodecyloxypropyl)oxy]-2-hydroxyphenyl]4,6-bis(2,4-dimethylphenyl)-1,3,5-triazine, 2-[4-[(2-hydroxy-3-tridecyloxypropyl)oxy]-2-hydroxyphenyl]-4,6-b is(2, 4dimethylphenyl)-1,3,5-triazine, 2-[4-[2-hydroxy-3-(2'-ethyl)hexyl]oxy]-2-hydroxyphenyl]-4,6-bis(2,4-dimethylphenyl)-1,3,5-triazine, 2,4-bis(2-hydroxy-4-butyloxyphenyl)-6-(2,4-bis-butyloxyphenyl)-1 ,3,5-triazine, and 2-(2-hydroxy-4-[1-octyloxycarbonylethoxy]phenyl)-4, 6-bis(4-pheny lphenyl)-1,3,5-triazine; benzotriazole-based ultraviolet absorbers such as 2-(2H-benzotriazole-2-yl)4-methylphenol, 2-(2H-benzotriazole-2-yl)4-tert-octylphenol, 2-(2H-benzotriazole-2-yl)-4,6-bis(1-methyl-1-phenylethyl) phenol, 2-(2H-benzotriazol-2-yl)-4,6-di-tert-pentylphenol, 2-(5-chloro-2H-benzotriazol-2-yl)-4-methyl-6-tert-butylphenol, and 2-(5-chloro-2H-benzotriazol-2-yl)-2,4-tert-butylphenol, 2,2'-methylene bis[6-(2H-benzotriazol-2-yl)-4-(1,1,3,3-tetramethylbutyl)phenol], and the examples preferably include a benzotriazole-based ultraviolet absorber of 2-(2H-benzotriazol-2-yl)-4-tert-octylphenol or 2-(5-chloro-2H-benzotriazol-2-yl)-4-methyl-6-tert-butylphenol. These ultraviolet absorbers can be used alone or two or more can be used in combination.

<Process for Producing Polymerizable Composition for Optical Material>

The polymerizable composition for an optical material of the present embodiment can be obtained by mixing the above-described components. A molar ratio of a mercapto group and/or a hydroxyl group contained in the active hydrogen compound (C) with respect to an isocyanate group contained in the isocyanate compound (B), or a molar ratio of a mercapto group and/or a hydroxyl group contained in the active hydrogen compound (C) with respect to a sum of the isocyanate group contained in the isocyanate compound (B) and the polyisocyanate-modified product (D) is in a range of 0.8 to 1.2, preferably in a range of 0.85 to 1.15, and more preferably in a range of 0.9 to 1.1. In the above-described range, it is possible to obtain an optical material, particularly, a resin preferably used as a plastic lens material for spectacles.

A use amount of the compound (A) is in a range of equal to or more than 0.0005 parts by weight and equal to or less than 5 parts by weight, preferably in a range of equal to or more than 0.001 parts by weight and equal to or less than 4 parts by weight, and more preferably in a range of equal to or more than 0.001 parts by weight and equal to or less than 3 parts by weight, with respect to a sum of 100 parts by weight of the isocyanate compound (B) and the active hydrogen compound (C) or a sum of 100 parts by weight of the isocyanate compound (B), the polyisocyanate-modified product (D), and the active hydrogen compound (C). The use amount can be appropriately set depending on the kind of the compound (A), the kind and the use amount of the used monomers (the isocyanate compound (B), the active hydrogen compound (C), the polyisocyanate-modified product (D), and other components), and the form of the mold product.

A temperature in a case of preparing the polymerizable composition by mixing the above-described components is generally equal to or less than 25° C. From a viewpoint of pot life of the polymerizable composition, there is a case where a lower temperature is preferable. Here, in a case where solubility of an internal mold release agent, an additive, and the like in the above-described components is not favorable, the above-described components can be heated in advance and dissolved.

<Process for Producing Plastic Lens>

In the present embodiment, a plastic lens comprised of a (thio)urethane resin is not particularly limited, but is obtained by cast polymerization including the following steps, as a preferable producing method.

Step a: The polymerizable composition for an optical material of the present embodiment is casted in a mold.
Step b: The polymerizable composition is heated, and the composition is polymerized.

(Step a)

First, a polymerizable composition is injected in a mold held by a gasket or a tape. At this time, depending on properties required for the obtained plastic lens, degassing treatment under reduced pressure, filtration treatment under pressure or under reduced pressure, or the like is preferably performed, if necessary, in many cases.

(Step b)

The polymerization condition is not particularly limited, since the polymerization condition significantly varies depending on the composition of the polymerizable composition, the kind and the use amount of the catalyst, the form of the mold, and the like. The polymerization is performed at a temperature of −50° C. to 150° C. for 1 to 72 hours. Depending on the case, it is preferable to retain the temperature in a range of 10° C. to 150° C. or to gradually raise the temperature, and to perform curing for 1 to 25 hours.

The plastic lens comprised of a (thio)urethane resin of the present embodiment may be subjected to a treatment such as annealing, depending on the necessity. The treatment temperature is generally between 50° C. and 150° C., preferably from 90° C. 140° C., and more preferably 100° C. to 130° C.

In the present embodiment, when molding an optical material comprised of a (thio)urethane resin, in addition to the above-described "other components", similar to the known molding method, various additives such as a chain extender, a cross-linking agent, an oil-soluble pigment, a filler, and an adhesion improving agent may be added, depending on the purpose.

The polymerizable composition of the present embodiment can be obtained as optical materials having various shapes by changing the mold at the time of cast polymerization. The optical material of the present embodiment can be in a desired shape, and can be optical materials having various shapes by including a coat layer or other members formed depending on the necessity.

The plastic lens obtained by curing the polymerizable composition of the present embodiment may be used by including a coating layer on one surface or both surfaces. Examples of the coating layer include a hard coat layer, an anti-reflection layer, an anti-fogging coat film layer, an anti-pollution layer, a water-repellent layer, a primer layer, a photochromic layer, and the like. These coating layers can be used alone or a plurality of coating layers can be multi-layered and used. In a case where a coating layer is included on both surfaces, the same coating layer may be included or the different coating layer may be included in each surface.

In a case where the optical material of the present embodiment is applied to a spectacle lens, a hard coat layer and/or an anti-reflection layer can be formed at least one surface of the optical material (lens) obtained by curing the polymerizable composition of the present embodiment. In addition, a layer other than the above-described layers can be included. Since, as the spectacle lens obtained in such a manner, a lens comprised of a specific polymerizable composition is used, the lens is excellent in shock resistance, even in a case of using the coat layer.

The hard coat layer is a coating layer which is provided on at least one surface of the optical material (lens) obtained by using the polymerizable composition of the present embodiment, and is aimed to impart functions such as scratch resistance, abrasion resistance, moisture resistance, hot water resistance, heat resistance, and light resistance to a lens surface. The hard coat layer is obtained from a composition containing one or more metal oxides selected from the element group consisting of silicon, titanium, zirconium, tin, aluminum, tungsten, and antimony and a silane compound and hydrolysate thereof having at least one or more functional groups selected from an alkyl group, an allyl group, an alkoxy group, a methacryloxy group, an acryloxy group, an epoxy group, an amine group, an isocyanate group, and a mercapto group.

A curing agent may be included in the hard coat composition for the purpose of promoting curing. Specific examples of the curing agent include an inorganic acid, an organic acid, amine, a metal complex, an organic acid metal salt, a metallic chloride, and the like. A solvent may be used in preparation of the hard coat composition. Specific examples of the solvent include water, alcohols, ethers, ketones, esters, and the like.

The hard coat layer is formed by applying the hard coat composition to a surface of the molded product by a known applying method such as spin coat and dipping coat, and then performing curing. Examples of the curing method include heat curing, and a curing method by energy ray emission such as ultraviolet rays and visible rays. In a case of performing heat curing, it is preferable to perform heat curing at a temperature of from 80° C. to 120° C. for 1 to 4 hours. In order to suppress occurrence of interference fringe, a refractive index of the hard coat layer is preferably such that a difference between the refractive index of the hard coat layer and the refractive index of the molded product is in a range of ±0.1.

Before imparting the hard coat layer, a surface of the base is preferably is subjected to ultrasonic washing with an alkali aqueous solution so as to satisfy the following conditions (a) to (d).

(a) A sodium hydroxide or potassium hydroxide aqueous solution containing 5% to 40% of alkali aqueous solution,
(b) A treatment temperature of the alkali aqueous solution is 30° C. to 60° C.,
(c) A treatment time is 3 to 5 minutes,
(d) Ultrasonic frequency is 20 to 30 kHz.

After washing with an alkali aqueous solution, washing with a distilled water or alcohols such as isopropanol may be performed, and the surface of the molded product may be dried at a temperature in a range of 50° C. to 80° C. for 5 to 20 minutes.

The molded product obtained from the polymerizable composition of the present embodiment is excellent in alkali resistance, and even after washing with the alkali aqueous solution, occurrence of cloudiness is suppressed.

The anti-reflection layer is a coating layer which is provided on at least one surface of the molded product (lens), and is aimed to enhance a transmittance by decreasing a reflectivity caused from a difference between a refractive index of air and a refractive index of the molded product, and significantly reducing reflection of light on the surface of the plastic lens. The anti-reflection layer in the present embodiment is formed of a low-refractive index-film layer containing silicon oxide and a high-refractive index-film layer containing one or more metal oxides selected from titanium oxide, zirconium oxide, aluminum oxide, zinc oxide, cerium oxide, antimony oxide, tin oxide, and tantalum oxide, and each layer may have a single-layer structure or a multi-layer structure.

In a case where the anti-reflective layer has a multi-layer structure, 5 to 7 layers are preferably stacked. A film thickness is preferably 100 to 300 nm, and more preferably 150 to 250 nm. Examples of the method of forming a multi-layer anti-reflection layer include vacuum deposition method, sputtering method, ion plating method, ion beam assist method, CVD method, and the like.

On the anti-reflection layer, an anti-fogging coat film layer, an anti-pollution layer, and a water-repellent layer may be formed depending on the necessity. The method of forming an anti-fogging coat layer, an anti-pollution layer, and a water-repellent layer is not particularly limited in terms of the treatment method, the treatment material, and the like as long as the method does not have an adverse effect on the anti-reflection function, and known anti-fogging coat treatment method, anti-pollution treatment method, water-repellent treatment method, and a known material can be used. Examples of the anti-fogging coat, anti-pollution treatment method include a method of covering a surface with a surfactant, a method of enhancing water absorbency by adding a hydrophilic film on a surface, a method of enhancing water absorbency by covering a surface with fine irregularities, a method of enhancing water absorbency by using photocatalyst activity, a method of preventing adhesion of water droplets by performing super water-repellent treatment, and the like. In addition, examples of the water-repellent treatment method include a method of forming a water-repellent treatment layer by performing vapor deposition or sputtering of a fluorine-containing silane compound and the like, a method of forming a water-repellent treatment layer by dissolving a fluorine-containing silane compound in a solvent and coating thereof, and the like.

In the coating layer, an ultraviolet absorber for the purpose of protecting lenses or eyes from ultraviolet rays, an infrared absorber for the purpose of protecting eyes from infrared rays, a photostabilizer or an anti-oxidant for the purpose of enhancing weather resistance of lenses, a pigment or a dye for the purpose of enhancing fashionability of lenses, a photochromic pigment or a photochromic dye, an anti-static agent, and other known additives for enhancing performance of lenses may be used in combination. On a layer on which coating is performed by application, various leveling agents for the purpose of improving applicability may be used.

In an optical material using the polymerizable composition of the present embodiment, for the purpose of imparting fashionability or photochromic properties, a colorant may be used, or the optical material may be dyed and used depending on the purpose. The dyeing of the lenses can be performed by using a known dyeing method, and generally performed by the method shown below.

In general, a method is used in which a lens cloth finished on a predetermined optical surface is immersed in a dyeing solution in which a colorant used is dissolved or uniformly dispersed (dyeing step), and the lens is heated depending on the necessity to fix the colorant (dyeing and annealing step). The colorant used in the dyeing step is not particularly limited as long as the colorant is a known colorant, and generally an oil-soluble pigment or dispersing pigment is used. The solvent used in the dyeing step is not particularly limited as long as the colorant used can be dissolved or uniformly dispersed therein. In the dyeing step, a surfactant for dispersing the colorant in a dyeing liquid, a carrier for promoting dyeing may be added depending on the necessity.

In the dyeing step, a colorant and a surfactant added depending on the necessity are dispersed in water or a mixture of water and an organic solvent to prepare a dyeing bath, an optical lens is immersed in the dying bath, and dyeing is performed at a predetermined temperature for a predetermined time. The dyeing temperature and time vary depending on a desired coloring concentration, and generally the dyeing may be performed at equal to or less than 120° C. for several minutes to several tens of minutes, and the pigment concentration of the dyeing bath is 0.01% by weight to 10% by weight. In addition, in a case where the dyeing is difficult, the dyeing may be performed under pressure.

The dyeing and annealing step performed depending on the necessity is a step in which heating treatment is subjected to the dyed lens cloth. In the heating treatment, water remaining on a surface of the lens cloth dyed in the dyeing step is removed by using a solvent and the like, the solvent is air-dried, and water is retained in a furnace such as infrared heating furnace in atmosphere and resistance heating furnace for a predetermined time. In the dyeing and annealing step, color fading of the dyed lens cloth is prevented (color fading prevention treatment), and removal of moisture transmitted in an interior of the lens cloth at the time of dyeing is performed. In the present embodiment, in a case where an alcohol compound is not contained, non-uniformity after dyeing is small.

<Plastic Polarizing Lens>

The optical material obtained by curing the polymerizable composition of the present embodiment can be used as a lens base for a plastic polarizing lens. In the present embodiment, the plastic polarizing lens includes a polarizing film and a base layer (lens base) formed of a molded product obtained by curing the polymerizable composition for an optical material of the present embodiment, which is formed on at least one surface of the polarizing film.

The polarizing film in the present embodiment can be constituted of a thermoplastic resin. Examples of the thermoplastic resin include a polyester resin, a polycarbonate resin, a polyolefin resin, a polyimide resin, a polyvinyl alcohol resin, a polyvinyl chloride resin, and the like. From a viewpoint of water resistance, heat resistance, and moldability, the polyester resin and the polycarbonate resin are preferable and the polyester resin is more preferable.

Examples of the polyester resin include polyethylene terephthalate, polyethylene naphthalate, polybutylene terephthalate, and the like, and from a viewpoint of water resistance, heat resistance, and moldability, polyethylene terephthalate is preferable.

Specific examples of the polarizing film include a dichroic dye-containing polyester polarizing film, an iodine-containing polyvinyl alcohol polarizing film, a dichroic dye-containing polyvinyl alcohol polarizing film, and the like.

The polarizing film may be used by being subjected to heat treatment for drying and stabilization.

In addition, the polarizing film may be used by being subjected to one or two or more pre-treatments selected from primer coating treatment, chemical treatment (chemical liquid treatment such as gas or alkali), corona discharge treatment, plasma treatment, ultraviolet irradiation treatment, electron beam irradiation treatment, roughening treatment, and flame treatment. Among such pre-treatments, one or two or more selected from the primer coating treatment, the chemical treatment, the corona discharge treatment, and the plasma treatment are particularly preferable.

In the plastic polarizing lens of the present embodiment, a base layer obtained by curing the polymerizable composition for an optical material of the present embodiment is stacked over one surface of a surface on an objective side or a surface on an ocular side, or both surfaces of the surface on the objective side or the surface on the ocular side.

The base layer in the present embodiment may contain a layer formed of a plastic material such as an acrylic resin, an allyl carbonate resin, a polycarbonate resin, a polyurethane resin, a polythiourethane resin, and a polysulfide resin, in addition to a layer formed of a cured product of the polymerizable composition for an optical material of the present embodiment.

The plastic polarizing lens of the present embodiment is not particularly limited, and can be manufactured by a method of adhering a lens base manufactured in advance on both sides of the polarizing film, a method of performing cast polymerization of the polymerizable composition on both sides of the polarizing film, or the like. In the present embodiment, an example formed by the cast polymerization method is described.

In the present embodiment, the plastic polarizing lens can be obtained by a producing method including the following steps.

Step i: The polarizing film is fixed inside a lens cast mold, in a state in which at least one surface of the polarizing film is separated from the mold.
Step ii: In a cavity between the polarizing film and the mold, the polymerizable composition of the present invention is injected.
Step iii: The polymerizable composition is polymerized and cured by heating to stack a layer comprised of a polyurethane resin over at least one surface of the polarizing film.

Hereinafter, each step is described in order.
(Step i)
In a space of a lens cast mold, a polarizing film comprised of thermoplastic polyester and the like is installed such that at least one film surface is in parallel with an opposing mold interior surface. Between the polarizing film and the mold, a cavity is formed. The polarizing film may be formed in advance.
(Step ii)
Subsequently, in the space of the lens cast mold, in the cavity between the mold and the polarizing film, the polymerizable composition for an optical material of the present invention is injected by predetermined injection means.
(Step iii)
Subsequently, the lens cast mold in which the polarizing film obtained by injecting the polymerizable composition for an optical material is fixed is heated and cured in a device capable of being heated in an oven or water at a predetermined temperature program for several hours to several tens of hours to be molded.

A temperature for polymerization and curing cannot be limited since the condition varies depending on the composition of the polymerizable composition, the kind of the catalyst, the shape of the mold, and the like, but polymerization and curing is performed at a temperature of 0° C. to 140° C. for 1 to 48 hours.

After fishing curing molding, by taking out the polarizing film from the lens cast mold, it is possible to obtain the plastic polarizing lens of the present embodiment on which a layer formed of a polyurethane resin is stacked over at least one surface of the polarizing film.

In the plastic polarizing lens of the present embodiment, it is desirable to heat the released lens and perform annealing treatment for the purpose of mitigating distortion by polymerization.

The plastic polarizing lens of the present embodiment is used by providing a coating layer on one surface or both surfaces depending on the necessity. Examples of the coating layer include a primer layer, a hard coat layer, an anti-reflection layer, an anti-fogging coat layer, an anti-pollution layer, a water-repellent layer, and the like, similar to the plastic lens. In addition, similar to the plastic lens, dyeing can be performed.

<Usage>

The (thio)urethane resin of the present embodiment can be obtained by changing the kind of the mold at the time of cast polymerization as molded bodies having various shapes, and can be appropriately used as an optical material.

Examples of the optical material of the present embodiment include various plastic lenses such as a plastic spectacle lens, a goggle, a spectacle lens for eyesight correction, a lens for imaging devices, a Fresnel lens for liquid crystal projector, a lenticular lens, and a contact lens, a prism, an optical fiber, an information recording substrate, a filter, a light emitting diode (LED), a sealing material for a light emitting diode (LED), an optical waveguide, an optical adhesive used in bonding an optical lens or an optical waveguide, an anti-reflection film used in optical lenses and the like, a transparent coating used in a liquid crystal display device member (substrate, conductive plate, film, sheet, and the like), a sheet or a film adhered to a front glass of a vehicle or an helmet of a bike, a transparent substrate, and the like. In particular, the optical material of the present embodiment can be appropriately used as a plastic lens material for spectacles.

Hereinabove, the present invention has been described by using the embodiment, but the present invention is not limited to the above-described embodiment and various aspects can be obtained within a range not impairing the effect of the present invention.

EXAMPLES

Hereinafter, the present invention will be specifically described based on examples, but the present invention is not limited to the examples. Evaluation of the molded product formed of a cured resin and a plastic lens was performed by the following method.

Cloudiness: A manufactured lens was irradiated to a projector in a dark place, and the presence or absence of cloudiness and opaque materials of the lens was visually determined, and evaluated based on the following criteria.
  A: Loss degree of transpareancy is less than 35
  B: Loss degree of transpareancy is equal to or more than 35 and equal to or less than 50
  C: Loss degree of transpareancy is equal to or more than 50 and equal to or less than 100
  D: Loss degree of transpareancy is equal to or more than 100

Striae: A lens was projected with an ultrahigh pressure mercury lamp (light source type OPM-252HEG: manufactured by Ushio Electric Co., Ltd), the transmitted image was visually observed, and evaluation was performed based on the following criteria.
  A: Striae were almost not observed, and there was no problem at all.
  B: Striae were observed, but at an acceptable level when being manufactured as a product (basically not problematic).
  C: There was a case where striae were observed and not acceptable as a product, and thus improvement was required.
  D: Many striae were observed and not acceptable as a product.

Heat resistance (glass transition temperature: Tg): Measurement was performed by a TMA penetration method (50 g load, pinpoint 0.5 mmØ, temperature rising rate 10° C./min) using a thermomechanical analyzer TMA-60 manufactured by Shimadzu Corporation.

Handleability (pot life): A viscosity right after preparation of the polymerizable composition and a viscosity after storing for 3 hours at 20° C. were measured using a type B viscometer, and a thickening amount from the value was calculated.

Releasability: Releasability of a molded product at releasing a lens from a mold was evaluated based on the following criteria.
  A: It is possible to release it without applying a force.
  B: It is possible to release it when applying a force (basically not problematic).
  C: It is possible to release it when applying a force, but there is a case where a mold or a lens is impaired.
  D: It is not possible to release it even if a force is applied, and a product is not obtained.

Example 1

54.3 parts by weight of 2,5-bis(isocyaatomethyl)bicyclo-[2.2.1]-heptane and 2,6-bis(isocyanatomethyl)bicyclo-[2.2.1]-heptane, 0.05 parts by weight of 2-(2-hydroxy-5-t-octylphenyl)-2H-benzotriazole (Biosorb 583), and 0.08 parts by weight of ZelecUN were put in 2,000 ml of three-neck flask, completely dissolved in a nitrogen atmosphere at 20° C., 0.06 parts by weight of R-picoline (pKa value=5.82) were put therein, and stirred for 10 minutes until the entirety was dissolved. Subsequently, 45.7 parts by weight of 4-mercaptomethyl-1,8-dimercapto-3,6-dithiaoctane were put and transferred to a bath of 10° C., and degassing was further performed for 30 minutes under a reduced pressure of 0.20 kPa, and stirring and mixing for 10 minutes to obtain a polymerizable composition.

In a mold configured of a 6-curve glass mold with a diameter of 78 mm (upper mold) and a 4-curve glass mold with a diameter of 78 mm (lower mold) and having a cavity for a lens preparation with a setting core thickness of 6 mm, the obtained polymerizable composition was injected into the cavity at a speed of 5 g/seconds. The mold in which the polymerizable composition was injected was put in a polymerization oven, the temperature was gradually raised from 20° C. to 130° C. for 20 hours, and polymerization was performed. After fishing polymerization, the mold was taken out from the oven, and the molded product was released from the cavity to obtain a lens. The evaluation result is shown in Table-1.

Example 2

A lens was obtained by the same technique as that of Example 1 except that β-picoline was set as 2.50 parts by weight of 2-methylpyrazine (pKa value=1.50) in Example 1. There was some resin coloring but the lens could be obtained. The evaluation result is shown in Table-1.

Example 3

A lens was obtained by the same technique as that of Example 1 except that β-picoline was set as 2.00 parts by weight of 3-chloropyridine (pKa value=2.84) in Example 1. The evaluation result is shown in Table-1.

Example 4

A lens was obtained by the same technique as that of Example 1 except that β-picoline was set as 0.04 parts by weight of 3,5-lutidine (pKa value=6.14) in Example 1. The evaluation result is shown in Table-1.

Example 5

A lens was obtained by the same technique as that of Example 1 except that β-picoline was set as 0.04 parts by weight of 2,6-lutidine (pKa value=6.60) in Example 1. The evaluation result is shown in Table-1.

Example 6

A lens was obtained by the same technique as that of Example 1 except that β-picoline was set as 0.01 parts by weight of 2,4,6-trimethylpyridine (pKa value=7.48) in Example 1. The evaluation result is shown in Table-1.

Example 7

A lens was obtained by the same technique as that of Example 1 except that β-picoline was set as 0.005 parts by weight of trioctylamine (pKa value=8.35) in Example 1. The evaluation result is shown in Table-1.

Example 8

24.15 parts by weight of pentamethylene diisocyanate, 28.15 parts by weight of isocyanurate product of pentamethylene diisocyanate, 0.05 parts by weight of 2-(2-hydroxy-5-t-octylphenyl)-2H-benzotriazole (Biosorb 583), and 0.025 parts by weight of ZelecUN were put in 2,000 ml of three-neck flask, completely dissolved in a nitrogen atmosphere at 20° C., 0.04 parts by weight of β-picoline (pKa value=5.82) were put therein, and stirred for 10 minutes until the entirety was dissolved. Subsequently, 14.65 parts by weight of pentaerthritol tetrakis mercaptopropionate and 33.05 parts by weight of a polythiol compound which is a mixture of 5,7-dimercaptomethyl-1,11-mercapto-3,6,9-trithiaundecane, 4,7-dimercaptomethyl-1,11-mercapto-3,6,9-trithiaundecane, and 4,8-dimercaptomethyl-1,11-mercapto-3,6,9-trithiaundecane were put and transferred to a bath of 10° C., and stirring and mixing for 10 minutes and degassing was further performed for 30 minutes under a reduced pressure of 0.20 kPa to obtain a polymerizable composition.

The polymerizable composition was polymerized by the same method as that of Example 1 to obtain a lens. The evaluation result is shown in Table-1.

Example 9

A lens was obtained by the same technique as that of Example 8 except that β-picoline was set as 2.00 parts by weight of 2-methylpyrazine (pKa value=1.50) in Example 8. The evaluation result is shown in Table-1.

Example 10

A lens was obtained by the same technique as that of Example 8 except that β-picoline was set as 1.00 parts by weight of 3-chloropyridine (pKa value=2.84) in Example 8. The evaluation result is shown in Table-1.

Example 11

A lens was obtained by the same technique as that of Example 8 except that β-picoline was set as 0.04 parts by weight of 3,5-lutidine (pKa value=6.14) in Example 8. The evaluation result is shown in Table-1.

Example 12

A lens was obtained by the same technique as that of Example 8 except that β-picoline was set as 0.02 parts by weight of 2,6-lutidine (pKa value=6.60) in Example 8. The evaluation result is shown in Table-1.

Example 13

A lens was obtained by the same technique as that of Example 8 except that β-picoline was set as 0.0075 parts by weight of 2,4,6-trimethylpyridine (pKa value=7.48) in Example 8. The evaluation result is shown in Table-1.

Example 14

A lens was obtained by the same technique as that of Example 8 except that β-picoline was set as 0.003 parts by weight of trioctylamine (pKa value=8.35) in Example 8. The evaluation result is shown in Table-1.

Comparative Example 1

A lens was obtained by the same technique as that of Example 1 except that β-picoline was set as 2.00 parts by weight of 2-chloropyridine (pKa value=0.72) in Example 1. However, since polymerization was not proceeded, preparation of the lens was given up.

Comparative Example 2

A lens was obtained by the same technique as that of Example 1 except that p-picoline was set as 0.001 parts by weight of triethylamine (pKa value=10.72) in Example 1. However, soon after mixing the polymerizable composition, remarkable thickening occurred, and cast became difficult, and thus a lens cannot be obtained.

TABLE 1

| | | Example 1 | Example 2 | Example 3 | Example 4 | Example 5 | Example 6 | Example 7 |
|---|---|---|---|---|---|---|---|---|
| Compound (A) (parts by weight) | A1 (pKa: 5.82) | 0.06 | | | | | | |
| | A2 (pKa: 1.50) | | 2.50 | | | | | |
| | A3 (pKa: 2.84) | | | 2.00 | | | | |
| | A4 (pKa: 6.14) | | | | 0.04 | | | |
| | A5 (pKa: 6.60) | | | | | 0.04 | | |
| | A6 (pKa: 7.48) | | | | | | 0.01 | |
| | A7 (pKa: 8.35) | | | | | | | 0.005 |
| Polyisocyanate (B) (parts by weight) | B1 | 54.3 | 54.3 | 54.3 | 54.3 | 54.3 | 54.3 | 54.3 |
| | B2 | | | | | | | |
| | B3 | | | | | | | |
| Polythiol (C) (parts by weight) | C1 | 45.7 | 45.7 | 45.7 | 45.7 | 45.7 | 45.7 | 45.7 |
| | C2 | | | | | | | |
| | C3 | | | | | | | |
| Mold release agent amount (parts by weight) | | 0.08 | 0.08 | 0.08 | 0.08 | 0.08 | 0.08 | 0.08 |
| UV absorber (parts by weight) | | 0.05 | 0.05 | 0.05 | 0.05 | 0.05 | 0.05 | 0.05 |
| Cloudiness | | A | A | A | A | A | A | A |
| Striae | | A | B | B | B | A | B | C |

TABLE 1-continued

|  | Example 1 | Example 2 | Example 3 | Example 4 | Example 5 | Example 6 | Example 7 |
|---|---|---|---|---|---|---|---|
| Heat resistance | 110 | 73 | 74 | 107 | 112 | 101 | 106 |
| Handleability (pot life) | <50 | <50 | <50 | <50 | <50 | <50 | <50 |
| Releasability | A | B | B | B | B | A | A |

TABLE 2

|  |  | Example 8 | Example 9 | Example 10 | Example 11 | Example 12 | Example 13 | Example 14 | Comparative Example 1 | Comparative Example 2 |
|---|---|---|---|---|---|---|---|---|---|---|
| Compound (A) (parts by weight) | A1 (pKa: 5.82) | 0.04 |  |  |  |  |  |  |  |  |
|  | A2 (pKa: 1.50) |  | 2.00 |  |  |  |  |  |  |  |
|  | A3 (pKa: 2.84) |  |  | 1.00 |  |  |  |  |  |  |
|  | A4 (pKa: 6.14) |  |  |  | 0.04 |  |  |  |  |  |
|  | A5 (pKa: 6.60) |  |  |  |  | 0.02 |  |  |  |  |
|  | A6 (pKa: 7.48) |  |  |  |  |  | 0.0075 |  |  |  |
|  | A7 (pKa: 8.35) |  |  |  |  |  |  | 0.003 |  |  |
|  | A8 (pKa: 0.72) |  |  |  |  |  |  |  | 2.00 |  |
|  | A9 (pKa: 10.72) |  |  |  |  |  |  |  |  | 0.001 |
| Polyisocyanate (B) (parts by weight) | B1 |  |  |  |  |  |  |  | 54.3 | 54.3 |
|  | B2 | 24.15 | 24.15 | 24.15 | 24.15 | 24.15 | 24.15 | 24.15 |  |  |
|  | B3 | 28.15 | 28.15 | 28.15 | 28.15 | 28.15 | 28.15 | 28.15 |  |  |
| Polythiol (C) (parts by weight) | C1 |  |  |  |  |  |  |  | 45.7 | 45.7 |
|  | C2 | 14.65 | 14.65 | 14.65 | 14.65 | 14.65 | 14.65 | 14.65 |  |  |
|  | C3 | 33.05 | 33.05 | 33.05 | 33.05 | 33.05 | 33.05 | 33.05 |  |  |
| Mold release agent amount (parts by weight) |  | 0.025 | 0.025 | 0.025 | 0.025 | 0.025 | 0.025 | 0.025 | 0.08 | 0.08 |
| UV absorber (parts by weight) |  | 0.05 | 0.05 | 0.05 | 0.05 | 0.05 | 0.05 | 0.05 | 0.05 | 0.05 |
| Cloudiness |  | A | A | A | A | A | A | A | — | — |
| Striae |  | A | B | B | B | B | C | C | — | — |
| Heat resistance |  | 87 | 77 | 79 | 86 | 86 | 87 | 85 | — | — |
| Handleability (pot life) |  | <50 | <50 | <50 | <50 | <50 | <50 | <50 | >200 | >200 |
| Releasability |  | B | B | B | B | B | A | A | — | — |

The compounds described in Table-1 are as follows.

A1: β-picoline (pKa value=5.82)

A2: 2-methylpyridine (pKa value=1.50)

A3: 3-chloropyridine (pKa value=2.84)

A4: 3,5-lutidine (pKa value=6.14)

A5: 2,6-lutidine (pKa value=6.60)

A6: 2,4,6-trimethylpyridine (pKa value=7.48)

A7: trioctylamine (pKa value=8.35)

A8: 2-chloropyridine (pKa value=0.72)

A9: triethylamine (pKa value=10.72)

B1: 2,5-bis(isocyanatomethyl)bicyclo-[2.2.1]-heptane, 2,6-bis(isocyanatomethyl)bicyclo-[2.2.1]-heptane B2: Pentamethylene diisocyanate B3: Isocyanurate product of pentamethylene diisocyanate C1: 4-mercaptomethyl-1,8-dimercapto-3,6-dithiaoctane C2: Pentaerythritol tetrakis mercaptopropionate C3: Mixture of 5,7-dimercaptomethyl-1,11-mercapto-3,6,9-trithiaundecane, 4,7-dimercaptomethyl-1,11-mercapto-3,6,9-trithiaundecane, and 4,8-dimercaptomethyl-1,11-mercapto-3,6,9-trithiaundecane Priority is claimed on Japanese Patent Application No. 2016-212583, filed on Oct. 31, 2016, all the content of which is incorporated herein.

The present invention obtains the following aspect.

[a1] A polymerizable composition for an optical material including:

(A) a compound of which pKa value is 1 to 9;

(B) a di- or higher functional iso(thio)cyanate compound; and (C) a di- or higher functional active hydrogen compound.

[a2] The polymerizable composition for an optical material according to [a1], in which the compound (A) is at least one selected from a compound represented by the following general formula (1a).

(1a)

in general formula (1a), $R_1$ represents a straight chain alkyl group having 1 to 20 carbon atoms, a branched alkyl group having 3 to 20 carbon atoms, a cycloalkyl group having 3 to 20 carbon atoms, or a halogen atom, and $R_1$ which exists in plural numbers may be the same or different. m represents an integer of 0 to 5.

[a3] The polymerizable composition for an optical material according to [a2], in which the compound (A) is at least one selected from pyridine, α-picoline, β-picoline, γ-picoline, 2,6-lutidine, 3,5-lutidine, and 2,4,6-trimethylpyridine.

[a4] The polymerizable composition for an optical material according to any one of [a1] to [a3], further comprising: a polyisocyanate-modified product (D).

[a5] The polymerizable composition for an optical material according to [a4], in which the polyisocyanate-modified product (D) is an isocyanurate product of aliphatic polyisocyanate.

[a6] The polymerizable composition for an optical material according to any one of [a1] to [a5], in which the iso(thio)cyanate compound (B) is at least one selected from a group consisting of hexamethylene diisocyanate, pentamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, trylene diisocyanate, phenylene diisocyanate, and 4,4'-diphenylmethane diisocyanate.

[a7] The polymerizable composition for an optical material according to any one of [a1] to [a6], in which the active hydrogen compound (C) is a di- or higher functional polythiol compound and/or di- or higher functional polyol compound.

[a8] The polymerizable composition for an optical material according to [a7], in which the active hydrogen compound (C) is a di- or higher functional polythiol compound.

[a9] The polymerizable composition for an optical material according to [a7] or [a8], in which the polythiol compound is at least one selected from a group consisting of pentaerythritol tetrakis(2-mercaptoacetate), pentaerythritol tetrakis(3-mercaptopropionate), bis(2-mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, and ethylene glycol bis(3-mercaptopropionate).

[a10] A molded product obtained by curing the polymerizable composition for an optical material according to any one of [a1] to [a9].

[a11] An optical material comprised of the molded product according to [a10].

[a12] A plastic lens comprised of the molded product according to [a10].

[a13] A process for producing a plastic lens including:
a step of molding the polymerizable composition for an optical material according to any one of [a1] to [a9] into a mold; and
a step of heating the polymerizable composition for an optical material to polymerize the composition.

[a14] A process for producing a plastic polarizing lens including:
a step of fixing a polarizing film in a mold for a lens cast, in a state in which at least one surface of the polarizing film is separated from the mold;
a step of injecting the polymerizable composition for an optical material according to any one of [a1] to [a9] into a cavity between the polarizing film and the mold; and
a step of polymerizing and curing the polymerizable composition for an optical material to stack a base layer over at least one surface of the polarizing film.

The invention claimed is:
1. A polymerizable composition for an optical material, consisting of:
(A) a compound of which pKa value is 1 to 9;
(B) a di- or higher functional iso(thio)cyanate compound;
(C) a di- or higher functional active hydrogen compound; and
at least one selected from the group consisting of a polyisocyanate-modified product (D), an internal mold release agent, a resin modifier, a photostabilizer, a bluing agent, an ultraviolet absorber, an anti-oxidant, a coloring inhibitor, and a pigment,
wherein the compound (A) is at least one selected from 2-methylpyrazine, 2,6-lutidine, 3,5-lutidine, 3-chlorpyridine, and a compound represented by the following general formula (2) as a sole polymerization catalyst:

wherein, in general formula (2), $R_2$, $R_3$, and $R_4$ may be the same or different, and represent a pentyl group, a hexyl group, a heptyl group, a nonyl group, or a decyl group.

2. The polymerizable composition for an optical material according to claim 1,
wherein the polyisocyanate-modified product (D) is an isocyanurate product of aliphatic polyisocyanate.

3. The polymerizable composition for an optical material according to claim 1,
wherein the iso(thio)cyanate compound (B) is at least one selected from a group consisting of hexamethylene diisocyanate, pentamethylene diisocyanate, xylylene diisocyanate, isophorone diisocyanate, bis(isocyanatomethyl)cyclohexane, bis(isocyanatocyclohexyl)methane, 2,5-bis(isocyanatomethyl)bicyclo-[2.2.1]-heptane, 2,6-bis(isocyanatomethyl)bicyclo-[2.2.1]-heptane, trylene diisocyanate, phenylene diisocyanate, and 4,4'-diphenylmethane diisocyanate.

4. The polymerizable composition for an optical material according to claim 1,
wherein the active hydrogen compound (C) is a di- or higher functional polythiol compound and/or di- or higher functional polyol compound.

5. The polymerizable composition for an optical material according to claim 4,
wherein the active hydrogen compound (C) is a di- or higher functional polythiol compound.

6. The polymerizable composition for an optical material according to claim 4,
wherein the polythiol compound is at least one selected from a group consisting of pentaerythritol tetrakis(2-mercaptoacetate), pentaerythritol tetrakis(3-mercaptopropionate), bis(2-mercaptoethyl)sulfide, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane, 2-(2,2-bis(mercaptomethylthio)ethyl)-1,3-dithiethane, and ethylene glycol bis(3-mercaptopropionate).

7. A molded product obtained by curing the polymerizable composition for an optical material according to claim 1.

8. An optical material comprised of the molded product according to claim 7.

9. A plastic lens comprised of the molded product according to claim 7.

10. A process for producing a plastic lens, comprising:
a step of molding the polymerizable composition for an optical material according to claim 1 into a mold; and
a step of heating the polymerizable composition for an optical material to polymerize the composition.

* * * * *